(12) United States Patent
Li et al.

(10) Patent No.: US 12,123,489 B2
(45) Date of Patent: Oct. 22, 2024

(54) TRANSMISSION HOUSING

(71) Applicant: Jing-Jin Electric Technologies Co., Ltd., Beijing (CN)

(72) Inventors: Jianwen Li, Beijing (CN); Xudong Yang, Beijing (CN); Xianwen Zeng, Beijing (CN); Jiaqi Li, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/005,125

(22) PCT Filed: Aug. 14, 2020

(86) PCT No.: PCT/CN2020/109212
§ 371 (c)(1),
(2) Date: Jan. 11, 2023

(87) PCT Pub. No.: WO2022/021484
PCT Pub. Date: Feb. 3, 2022

(65) Prior Publication Data
US 2023/0258261 A1 Aug. 17, 2023

(30) Foreign Application Priority Data
Jul. 27, 2020 (CN) .......................... 202010730828.8

(51) Int. Cl.
*F16H 57/04* (2010.01)
*F28F 3/02* (2006.01)

(52) U.S. Cl.
CPC ..... *F16H 57/0415* (2013.01); *F16H 57/0413* (2013.01); *F16H 57/0424* (2013.01); *F28F 3/02* (2013.01)

(58) Field of Classification Search
CPC ............ F16H 57/0413; F16H 57/0415; F16H 57/0417; F16H 57/0423; F16H 57/0424; F16H 57/0452; F28F 3/02; F28F 3/12
See application file for complete search history.

(56) References Cited

U.S. PATENT DOCUMENTS 6,997,238 B1    2/2006    Ruthy et al.
7,222,485 B2 *    5/2007    Shibata .................. F16H 39/02
                                                                                          60/487

(Continued)

FOREIGN PATENT DOCUMENTS

CN    101310130 A    11/2008
CN    203500440 U *    3/2014

(Continued)

OTHER PUBLICATIONS

European Search Report in EP20947301.6, mailed Oct. 9, 2023, 4 pages.

(Continued)

*Primary Examiner* — Adam D Rogers
(74) *Attorney, Agent, or Firm* — ARENTFOX SCHIFF LLP

(57) ABSTRACT

A gearbox casing is provided in which a bottom part or a side part of the gearbox casing has a number of first coolant tanks. The gearbox casing above a bottom part of the first coolant tanks is provided therein with a lubricating liquid, and the first coolant tanks are used to cool the lubricating liquid. A first coolant tank is provided therein with a number of parallel partition walls, by which the first coolant tank is separated into at least two communicated sub-tanks that are provided with first fixed guide ribs and first suspended guide ribs to divide the coolant.

7 Claims, 2 Drawing Sheets

(56) References Cited

U.S. PATENT DOCUMENTS

| | | | |
|---|---|---|---|
| 10,344,639 B1 * | 7/2019 | Nickols | F02F 7/0043 |
| 10,969,009 B2 * | 4/2021 | Shin | F16H 57/0415 |
| 11,054,198 B2 * | 7/2021 | Choi | F28D 1/035 |
| 11,662,012 B2 * | 5/2023 | Li | F28F 3/12 |
| | | | 165/80.4 |
| 2004/0150271 A1 | 8/2004 | Koga et al. | |
| 2007/0216237 A1 * | 9/2007 | Leimann | F16H 57/0417 |
| | | | 74/606 A |
| 2007/0227697 A1 * | 10/2007 | Takahashi | H01L 23/473 |
| | | | 257/E23.098 |
| 2014/0202402 A1 | 7/2014 | Triantos et al. | |
| 2018/0320779 A1 | 11/2018 | Kaemmerer et al. | |
| 2019/0040774 A1 | 2/2019 | Palanchon | |
| 2019/0383389 A1 | 12/2019 | Shin et al. | |
| 2022/0316578 A1 | 10/2022 | Li et al. | |
| 2022/0316581 A1 | 10/2022 | Li et al. | |
| 2023/0258260 A1 * | 8/2023 | Li | F16H 57/0475 |
| | | | 74/606 A |

FOREIGN PATENT DOCUMENTS

| | | | | |
|---|---|---|---|---|
| CN | 103939582 A | | 7/2014 | |
| CN | 105190107 A | | 12/2015 | |
| CN | 106523666 A | | 3/2017 | |
| CN | 108351019 A | | 7/2018 | |
| CN | 209517839 U | * | 10/2019 | |
| CN | 110601450 A | | 12/2019 | |
| CN | 110630731 A | | 12/2019 | |
| CN | 110925405 A | | 3/2020 | |
| CN | 110953327 A | | 4/2020 | |
| CN | 114033847 A | * | 2/2022 | |
| DE | 3318199 C2 | * | 6/1987 | |
| JP | S511862 A | | 1/1976 | |
| JP | H10110812 A | | 4/1998 | |
| JP | 2008500497 A | | 1/2008 | |
| KR | 20190094084 A | * | 8/2019 | |
| KR | 20190141381 A | * | 12/2019 | |
| KR | 1020190141381 A | | 12/2019 | |

OTHER PUBLICATIONS

PCT International Search Report mailed Apr. 26, 2021, issued in PCT Application No. PCT/CN2020/109212.

Notification of First Office Action mailed Apr. 20, 2022, issued in corresponding Chinese Application No. 202010730828.8.

Office Action in JP2023505803, mailed Jan. 29, 2024, 9 pages.

* cited by examiner

TRANSMISSION HOUSING

CROSS-REFERENCE TO RELATED APPLICATIONS

This application is a National Phase of PCT/CN2020/109212, filed on Aug. 14, 2020, which claims priority to Chinese Patent Application No. 202010730828.8, filed on Jul. 27, 2020, the disclosures of each of which are hereby incorporated by reference in their entireties.

TECHNICAL FIELD

The present disclosure belongs to the technical field of gearbox structure, and more specifically, relates to a gearbox casing.

BACKGROUND

With the continuous development of the automobile industry, the gearbox and the entire power system need to face increasingly complex working conditions and users have comprehensive requirements on the maximum speed, temperature rise and service life of the gearbox urgently. The gearbox casing using conventional heat dissipation structures can no longer meet the development requirements of the automobile industry for vehicles with high power, high torque, maximum speed and maximum service life.

At present, the conventional liquid cooling heat dissipation structures of the gearbox casing have the disadvantages of small heat dissipation area and coolant blind area, which leads to low heat exchange rate between the gearbox casing and coolant and poor heat dissipation performance, and to a certain extent, damages the gearbox casing and internal operating parts, and affects the transmission performance and service life of the gearbox system.

SUMMARY

In view of the above problems, the present disclosure discloses a gearbox casing to overcome the above problems or at least partially solve the above problems.

In order to achieve the above objects, the present disclosure adopts the following technical solutions.

An aspect of the present disclosure discloses a gearbox casing, wherein a bottom part or a side part of the gearbox casing is provided with a number of first coolant tanks, the gearbox casing above a bottom part of the first coolant tanks is provided therein with a lubricating liquid, and the first coolant tanks are used to cool the lubricating liquid;

the first coolant tank is provided therein with a number of parallel partition walls, by which the first coolant tank is separated into at least two communicated sub-tanks; a plurality of first fixed guide ribs interlaced with each other are projected from the partition walls or an inner wall of the first coolant tank at two sides of each of the sub-tanks respectively, thereby forming a continuous S-shaped or maze shaped channel for the coolant to flow through;

the first coolant tank is provided thereon with a first liquid inlet and a first liquid outlet, which are provided at one end or two ends of the first coolant tank; first suspended guide ribs are isolatedly provided between two adjacent first fixed guide ribs, between the first fixed guide rib and the first liquid inlet, and/or between the first fixed guide rib and the first liquid outlet.

Further, the first suspended guide ribs are arranged obliquely with respect to the first fixed guide ribs.

Further, the bottom part of the first coolant tank has different depths at two sides of each of the first suspended guide ribs, so that inner and outer sides of the bottom part of the first coolant tank are of a wavy shape, and the depths of the bottom part of the first coolant tank can be adjusted according to positions of gears inside the gearbox casing.

Further, a top part of four side walls of the first coolant tank is provided with an annular groove, and the annular groove is provided therein with a sealing washer for sealing the first coolant tank.

Further, a number of threaded holes are provided outside the annular groove, a first cover plate is further provided on the first coolant tank, and the first cover plate is fixed on the first coolant tank via the threaded holes and screws;

the first cover plate and the screws are sunk down so that when the first cover plate is fixed on the first coolant tank, the bottom part of the gearbox casing is in a same plane.

Further, the first liquid inlet is communicated with a coolant channel inside a motor water jacket, or the first liquid inlet is connected with an outlet of a motor coolant channel.

Further, the bottom part or a side end surface of the gearbox casing is further provided with a second coolant tank to cool a side interior of the gearbox casing;

a second cover plate is provided on the second coolant tank, two ends of the second coolant tank are respectively provided with a second liquid inlet and a second liquid outlet, and the first liquid outlet is connected with the second liquid inlet.

Further, the second coolant tank is provided therein with a plurality of second fixed guide ribs, and two adjacent second fixed guide ribs are respectively connected with two opposite inner walls of the second coolant tank, so that the coolant flows between the plurality of second fixed guide ribs in a continuous S or maze shape;

second suspended guide ribs are isolatedly provided between two adjacent second fixed guide ribs, between the second fixed guide rib and the second liquid inlet, and/or between the second fixed guide rib and the second liquid outlet.

Further, the second suspended guide rib between the second fixed guide rib and the second liquid inlet is arranged obliquely with respect to a tank wall of the second coolant tank, and remaining second suspended guide ribs are arranged in parallel with the second fixed guide ribs;

a bottom part of the second coolant tank has different depths at two sides of each of the second suspended guide ribs, so that inner and outer sides of the bottom part of the second coolant tank are of a wavy shape;

an amplitude of the wavy shape at the bottom part of the second coolant tank decreases step by step from the second liquid inlet to the second liquid outlet.

Further, the second suspended guide ribs are a truncated cone, and a side surface of the truncated cone is composed of an arc surface and/or an inclined surface to prevent eddies.

The advantages and beneficial effects of the present disclosure are as follows.

In the gearbox casing according to the present disclosure, by providing a number of coolant tanks at the bottom part or the side part of the gearbox casing, the lubricating liquid in the gearbox casing can be cooled; by providing suspended guide ribs and fixed guide ribs in the coolant tanks to guide the flow direction of the circulating coolant, the heat dissipation contact area between the coolant and the gearbox casing is increased, and blind areas where the coolant does not flow or eddies are generated can be avoided. The gearbox casing according to the present disclosure has high heat exchange efficiency and low cost compared with other heat dissipation structures.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
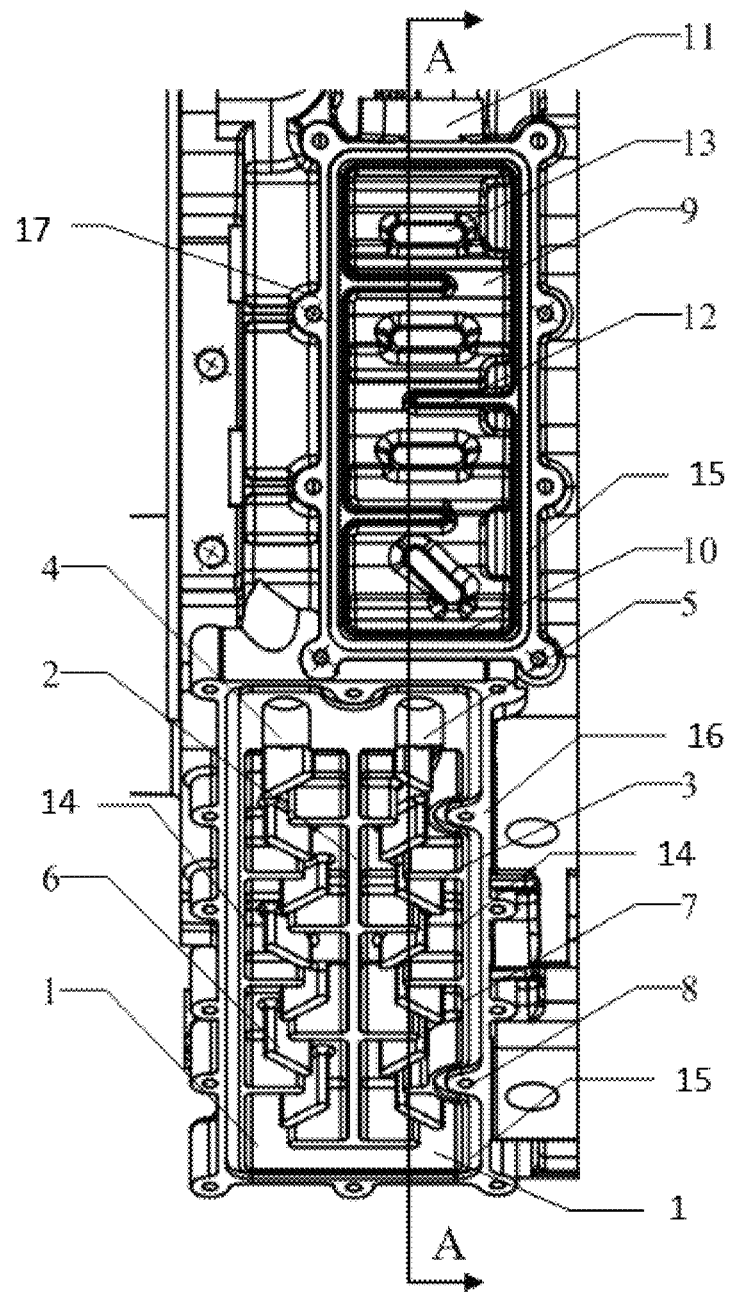
FIG. 1 is a schematic view of a gearbox casing according to an embodiment of the present disclosure.

In the drawings: 1. first coolant tank, 2. partition wall, 3. first fixed guide rib, 4. first liquid inlet, 5. first liquid outlet, 6. first suspended guide rib, 7. annular groove, 8. threaded hole, 9. second coolant tank, 10. second liquid inlet, 11. second liquid outlet, 12. second fixed guide rib, 13. second suspended guide rib.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described herein are only part of the embodiments of the present disclosure, rather than all of the embodiments. Based on the embodiments in the present disclosure, all other embodiments obtained by a person of ordinary skill in the art without paying creative work shall fall within the protection scope of the present disclosure.

The technical solutions of embodiments of the present disclosure will be described in detail below in conjunction with the accompanying drawings.

An embodiment of the present disclosure discloses a gearbox casing. As shown in FIG. 1, the bottom part or the side part of the gearbox casing is provided with a number of first coolant tanks 1, and the gearbox casing above a bottom part of the first coolant tanks 1 is provided therein with a lubricating liquid. By making the lubricating liquid contact the first coolant tanks 1 and circulating coolant in the first coolant tanks 1, the first coolant tanks 1 can cool the lubricating liquid, and thus reduces the temperature of the parts inside the gearbox casing.

A first coolant tank 1 is provided therein with a number of parallel partition walls 2. The first coolant tank 1 is separated into at least two communicated sub- tanks 14 by the partition walls 2. The number of sub-tanks 14 can be determined according to the width of the gearbox casing. A plurality of first fixed guide ribs 3 interlaced with each other are projected from the partition walls 2 or an inner wall of the first coolant tank 1 respectively at two sides of each of the sub-tanks 14, thereby forming a continuous S-shaped or maze shaped channel for the coolant to flow through. The first fixed guide ribs 3 are provided to increase the flow path of the coolant in the first coolant tank 1, thereby increasing the contact area between the coolant and inner walls of the first coolant tank 1 and promoting heat exchange.

Specifically, one end of the first fixed guide ribs 3 is connected with the inner walls of the first coolant tank 1 or the partition walls 2 at a certain angle, and a certain gap is provided between the other end of the first fixed guide ribs 3 and the inner walls of the first coolant tanks 1 or the partition walls 2 at the facing side. The angle and gap can be adjusted according to the flow path and flow rate of the coolant. The number and thickness of the first fixed guide ribs 3 can be adjusted according to the size of the sub-tanks and the wall thickness of the gearbox casing.

The first coolant tank 1 is provided with a first liquid inlet 4 and a first liquid outlet 5. The first liquid inlet 4 and the first liquid outlet 5 are provided at one or two ends of the first coolant tank 1. Of course, the positions of the first liquid inlet 4 and the first liquid outlet 5 can be adjusted as required. First suspended guide ribs 6 are isolatedly provided between two adjacent first fixed guide ribs 3, between the first fixed guide rib 3 and the first liquid inlet 4, and/or between the first fixed guide rib 3 and the first liquid outlet 5, which can prevent the coolant flow blind area and avoid eddies. The first fixed guide ribs 3 and the first suspended guide ribs 6 are provided to increase the heat dissipation area and improve the heat dissipation performance.

To sum up, in the gearbox casing according to the present disclosure, by providing a number of coolant tanks at the bottom part or the side part of the gearbox casing, the lubricating liquid in the gearbox casing can be cooled; by providing suspended guide ribs and fixed guide ribs in the coolant tanks to guide the flow direction of the circulating coolant, the heat dissipation contact area between the coolant and the gearbox casing is increased, and blind areas where the coolant does not flow or eddies are generated can be avoided. The gearbox casing according to the present disclosure has high heat exchange efficiency and low cost compared with other heat dissipation structures.

In an embodiment, as shown in FIG. 1, the first suspended guide ribs 6 are arranged obliquely with respect to the first fixed guide ribs 3, thereby increasing the disturbance of the coolant and facilitating the heat transfer. A certain angle is formed between the first suspended guide ribs 6 and the first fixed guide ribs 3. There is respectively a certain gap between each of two ends of the first suspended guide ribs 6 and the inner wall of the first coolant tank 1 or the partition wall 2 opposing the end. The coolant flows through the gap. The angle and gap can be adjusted according to the flow path and flow rate of the coolant. In addition, the number and thickness of the first suspended guide ribs 6 can be adjusted according to the size of the sub-tanks and the wall thickness of the gearbox casing.

Figure 2:
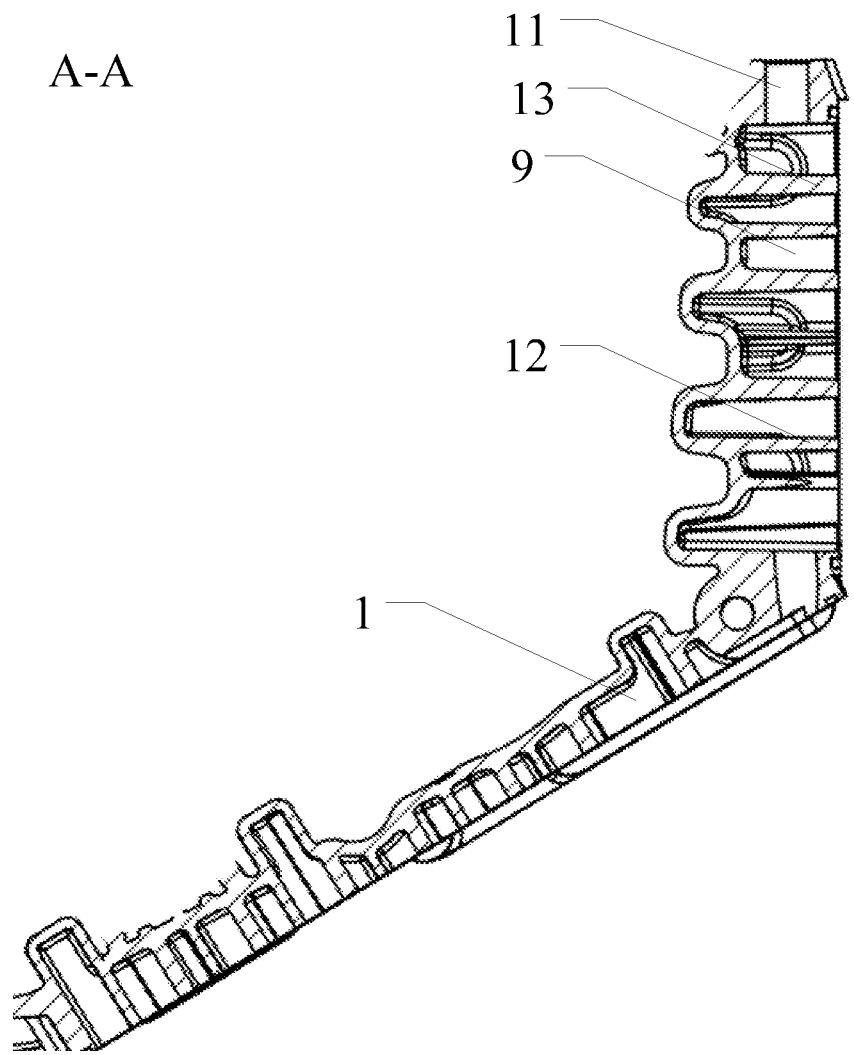
FIG. 2 is a sectional view taken along line A-A of FIG. 1 according to an embodiment of the present disclosure.

In a preferred embodiment, as shown in FIG. 2, the bottom part of the first coolant tanks 1 has different depths at two sides of each of the first suspended guide ribs 6, so that the inner and outer sides of the bottom part of the first coolant tanks 1 are of a wavy shape, and the depths of the bottom part of the first coolant tanks 1 can be adjusted according to the position of gears inside the gearbox casing. The provision of this structure can effectively increase the contact area between the first coolant tanks 1 and the lubricating liquid in the gearbox casing, and promote the heat dissipation.

In an embodiment, as shown in FIG. 1 , a top part of the four side walls of the first coolant tank 1 is provided with an annular groove 7, and the annular groove 7 is provided therein with a sealing washer 15 for sealing the first coolant tank 1.

In an embodiment, as shown in FIG. 1 , a number of threaded holes 8 are provided outside the annular groove 7. A first cover plate 16 is further provided on the first coolant tank 1, and the first cover plate 16 is fixed on the first coolant tank 1 via the threaded holes 8 and screws. The number and positions of threaded holes 8 can be adjusted as required. The first cover plate 16 and the screw are sunk down, so that when the first cover plate 16 is fixed on the first coolant tanks 1, the bottom part of the gearbox casing is in a same plane, thereby reducing the volume of the gearbox casing.

In an embodiment, the first liquid inlet 4 may be disposed on an end face of the gearbox casing that is connected to a motor casing, and the first liquid inlet 4 is communicated with a coolant channel inside a motor water jacket via a channel disposed on the motor casing. The circulating coolant enters the first coolant tank 1 of the gearbox from the motor coolant channel directly via the first liquid inlet 4 disposed on the gearbox casing at the connecting surface.

A water nozzle is provided at the first liquid inlet 4, and then the first liquid inlet 4 is connected with an outlet of the motor coolant channel via the coolant pipe. The circulating coolant flows out from the outlet of the motor coolant channel, and enters the first liquid inlet 4 disposed at the outer wall of the first coolant tank 1 of the gearbox via an external coolant pipe, and thus enters the first coolant tank 1 of the gearbox.

In an embodiment, as shown in FIGS. 1 and 2, the bottom part or a side end surface of the gearbox casing is further provided with a second coolant tank 9 to cool a side interior of the gearbox casing, such as the lubricating liquid. Of course, the number of second coolant tanks 9 may be more than one, which can be set according to a specific situation. The second coolant tank 9 is provided thereon with a second cover plate 17, a sealing ring is provided between the second cover plate 17 and the second coolant tank 9, which is fixed by screws and threaded holes. The second cover plate 17 is also sunk down. The two ends of the second coolant tank 9 are respectively provided with a second liquid inlet 10 and a second liquid outlet 11, and the first liquid outlet 5 is connected with the second liquid inlet 10. The second liquid outlet 11 is disposed higher than the first liquid inlet 4, so as to facilitate better heat transfer between the coolant and the gearbox casing.

In an embodiment, as shown in FIG. 1, the second coolant tank 9 is provided therein with a plurality of second fixed guide ribs 12, and two adjacent second fixed guide ribs 12 are respectively connected with two opposite inner walls of the second coolant tank 9, so that the coolant flows between the plurality of second fixed guide ribs 12 in a continuous S or maze shape. One end of the second fixed guide ribs 12 is connected with the inner wall of the second coolant tank 9 at a certain angle, and a certain gap is provided between the other end of the second fixed guide ribs 12 and the inner wall of the second coolant tank 9 at the opposite side. The angle and gap between the second fixed guide ribs 12 and the inner walls of the second coolant tank 9 can be adjusted according to the coolant flow path and flow rate. Moreover, the number and thickness of the second fixed guide ribs 12 can be adjusted according to the size and wall thickness of the gearbox casing.

In addition, second suspended guide ribs 13 are isolatedly provided between two adjacent second fixed guide ribs 12, between the second fixed guide rib 12 and the second liquid inlet 10, and/or between the second fixed guide rib 12 and the second liquid outlet 11, which can prevent the coolant flow blind area and avoid eddies. Only the bottom part of the second suspended guide ribs 13 is connected with the bottom part of the second coolant tank 9. The provision of the second fixed guide ribs 12 and, in particular, the second suspended guide ribs 13 can be used to increase the heat dissipation area, avoid eddies in the flow path, and improve the heat dissipation performance.

In an embodiment, as shown in FIG. 1, in order to better divide the coolant, the second suspended guide rib 13 between the second fixed guide rib 12 and the second liquid inlet 10 is arranged obliquely with respect to the tank wall of the second coolant tank 9, and the remaining second suspended guide ribs 13 are arranged in parallel with the second fixed guide ribs 12, which can effectively prevent eddies, make the coolant flow smoothly between the second fixed guide ribs 12 and the second suspended guide ribs 13. The bottom part of the second coolant tank 9 has different depths at two sides of each of the second suspended guide ribs 13, so that inner and outer sides of the bottom part of the second coolant tank 9 are of a wavy shape, thereby increasing the contact area between the coolant and the lubricating liquid in the gearbox casing and the bottom part of the second coolant tank 9, and promoting heat dissipation. The amplitude of the wavy shape can be adjusted.

It can be seen from FIG. 2 that, the amplitude of the wavy shape at the bottom part of the second coolant tank 9 decreases step by step from the second liquid inlet 10 to the second liquid outlet 11, which can avoid the coolant flow blind area and increase the heat dissipation effect.

In an embodiment, the second suspended guide ribs 13 are a truncated cone, and the side surface of the truncated cone is composed of an arc surface and/or an inclined surface to prevent eddies. Of course, the second suspended guide ribs 13 can also be other structures with excellent diversion effect. Similarly, the side surface of the second fixed guide ribs 12 can also be composed of an arc surface and/or an inclined surface, and have the same effect.

To sum up, the present disclosure discloses a gearbox casing. A bottom part or a side part of the gearbox casing is provided with a number of first coolant tanks, the gearbox casing above a bottom part of the first coolant tanks is provided therein with a lubricating liquid, and the first coolant tanks are used to cool the lubricating liquid. The first coolant tank is provided therein with a number of parallel partition walls, by which the first coolant tank is separated into at least two communicated sub-tanks. A plurality of first fixed guide ribs interlaced with each other are projected from the partition walls or an inner wall of the first coolant tank at two opposing sides of each of the sub-tanks respectively, thereby forming a continuous S-shaped or maze shaped channel for the coolant to flow through. The first coolant tank is provided thereon with a first liquid inlet and a first liquid outlet, which are provided at one end or two ends of the first coolant tank. First suspended guide ribs are isolatedly provided between two adjacent first fixed guide ribs, between the first fixed guide rib and the first liquid inlet, and/or between the first fixed guide rib and the first liquid outlet. In the gearbox casing according to the present disclosure, by providing a number of coolant tanks at the bottom part or the side part of the gearbox casing, the lubricating liquid in the gearbox casing can be cooled; by providing suspended guide ribs and fixed guide ribs in the coolant tanks to guide the flow direction of the circulating coolant, the heat dissipation contact area between the coolant and the gearbox casing is increased, and blind areas where the coolant does not flow or eddies are generated can be avoided. The gearbox casing according to the present disclosure has high heat exchange efficiency and low cost compared with other heat dissipation structures.

The above only describes the specific embodiments of the present disclosure. Under the above teaching of the present disclosure, a person skilled in the art can make other improvements or modifications on the basis of the above embodiment. A person skilled in the art should understand that the above specific description is turned only for the purpose of better explaining the present disclosure, and the protection scope of the present disclosure should be subject to the protection scope of the claims.

What is claimed is:

1. A gearbox casing having a bottom part or a side part with a number of first coolant tanks for cooling a lubricating liquid provided above a bottom part of the number of first coolant tanks, the gearbox casing comprising:
   a number of parallel partition walls provided in at least one of the first coolant tanks, by which the at least one of the first coolant tanks is separated into at least two communicated sub-tanks;
   a plurality of first fixed guide ribs interlaced with each other that are projected from the partition walls or an inner wall of the at least one first coolant tank at two sides of each of the sub-tanks, respectively, thereby forming a continuous S-shaped or zigzag shaped channel for a coolant to flow through,
   a number of threaded holes provided outside an annular groove; and
   a first cover plate provided on the at least one first coolant tank and that is fixed on the at least one first coolant tank via the threaded holes and screws,
   wherein the at least one of the first coolant tanks is provided thereon with a first liquid inlet and a first liquid outlet provided at one end or two ends of the at least one first coolant tank,
   wherein first suspended guide ribs are isolatedly provided between two adjacent first fixed guide ribs and/or between one of the first fixed guide ribs and the first liquid inlet,
   wherein the bottom part of the at least one of the first coolant tanks has different depths at two sides of each of the first suspended guide ribs, so that inner and outer sides of the bottom part of the at least one of the first coolant tanks are of a wavy shape, and the depths of the bottom part of the at least one of the first coolant tanks can be adjusted according to positions of gears inside the gearbox casing,
   wherein a top part of four side walls of the at least one of the first coolant tanks is provided with the annular groove, and the annular groove is provided therein with a sealing washer for sealing the at least one of the first coolant tanks, and
   wherein the first cover plate and the screws are sunk down so that when the first cover plate is fixed on the at least one first coolant tank, the bottom part of the gearbox casing is in a same plane.

2. The gearbox casing according to claim 1, wherein the first suspended guide ribs are arranged obliquely with respect to the first fixed guide ribs.

3. The gearbox casing according to claim 1,
   wherein the bottom part or a side end surface of the gearbox casing further comprises a second coolant tank configured to cool a side interior of the gearbox casing, and
   wherein a second cover plate is provided on the second coolant tank, two ends of the second coolant tank are respectively provided with a second liquid inlet and a second liquid outlet, and the first liquid outlet is connected with the second liquid inlet.

4. The gearbox casing according to claim 3,
   wherein the second coolant tank is provided therein with a plurality of second fixed guide ribs, and two adjacent second fixed guide ribs are respectively connected with two opposite inner walls of the second coolant tank, so that the coolant flows between the plurality of second fixed guide ribs in a continuous S or zigzag shape, and
   wherein second suspended guide ribs are isolatedly provided between two adjacent second fixed guide ribs and/or between the one of the second fixed guide ribs and the second liquid inlet.

5. The gearbox casing according to claim 4,
   wherein one of the second suspended guide ribs between the second fixed guide rib and the second liquid inlet is arranged obliquely with respect to a tank wall of the second coolant tank, and remaining second suspended guide ribs are arranged in parallel with the second fixed guide ribs,
   wherein a bottom part of the second coolant tank has different depths at two sides of each of the second suspended guide ribs, so that inner and outer sides of the bottom part of the second coolant tank are of a wavy shape, and
   wherein an amplitude of the wavy shape at the bottom part of the second coolant tank decreases step by step from the second liquid inlet to the second liquid outlet.

6. The gearbox casing according to claim 5, wherein the second suspended guide ribs are a truncated cone, and a side surface of each truncated cone comprises at least one of an arc surface and an inclined surface to prevent eddies.

7. The gearbox casing according to claim 4, wherein the second suspended guide ribs are a truncated cone, and a side surface of each truncated cone comprises at least one of an arc surface and an inclined surface to prevent eddies.

* * * * *